United States Patent [19]

Guidi

[11] 3,747,118

[45] July 17, 1973

[54] PORTABLE MAGNETIC TAPE RECORDER HAVING MEANS FOR ELIMINATING SWITCH BOUNCE

[75] Inventor: William R. Guidi, Huntington, N.Y.

[73] Assignee: Digital Technology Corporation, Halsite, N.Y.

[22] Filed: Dec. 18, 1970

[21] Appl. No.: 99,374

[52] U.S. Cl. 346/74 M, 340/174.1 A, 340/174.1 B, 340/365 E

[51] Int. Cl. ........................ G08c 25/00, G11b 15/00

[58] Field of Search ................................ 346/74 M; 370/174.1 A, 174.1 B; 178/17 R, 17 A, 17 C; 307/247 A; 340/365

[56] References Cited

UNITED STATES PATENTS

| | | | |
|---|---|---|---|
| 3,413,624 | 11/1968 | Murdoch | 340/174.1 A |
| 3,132,302 | 5/1964 | Smith | 307/247 A |
| 2,816,162 | 12/1957 | Johnson | 340/174.1 B |
| 3,530,239 | 9/1970 | Corell | 178/17 C |

*Primary Examiner*—Howard W. Britton
*Attorney*—Edward H. Loveman

[57] ABSTRACT

A portable recording device for recording data on magnetic tape which has manually operated make and break contact key switches. A transistorized detector circuit responds to a keying error constituting simultaneous operation of more than one key switch to actuate an error signal. The error condition prevents recording of any data until cleared by selective key operation. Integrated logic circuit means prevents storing and recording of data until spurious pulses generated by making and breaking key switch contacts are suppressed. A write circuit and dual recording head record data on two tracks simultaneously. An end of tape detector, a manually controlled advance circuit for the tape drive step motor, and an automatically actuated signal of low battery voltage are also provided.

5 Claims, 8 Drawing Figures

INVENTOR.
WILLIAM R. GUIDI

BY Edward H. Loveman

ATTORNEY

INVENTOR.
WILLIAM R. GUIDI
BY
Edward H. Loveman
ATTORNEY

INVENTOR.
WILLIAM R. GUIDI

BY Edward H. Loveman
ATTORNEY

INVENTOR.
WILLIAM R. GUIDI

BY

Edward H. Loveman

ATTORNEY

INVENTOR.
WILLIAM R. GUIDI

BY

Edward [signature]

ATTORNEY

INVENTOR.
WILLIAM R. GUIDI
BY
Edward H. Loveman
ATTORNEY

PORTABLE MAGNETIC TAPE RECORDER HAVING MEANS FOR ELIMINATING SWITCH BOUNCE

This invention relates to a portable, magnetic tape data recorder and more particularly concerns a portable magnetic tape data recorder having means for terminating recording upon detection of an input error and having electronic means for eliminating spurious signals.

Key operated, portable magnetic tape data recorders heretofore known have not proven generally successful. This is largely due to their lack of provisions for insuring a high level of overall reliability in their data recording capabilities. For reasons of economy, simplified key switches of the make-break contact type are used which tend to generate spurious signals due to erratic or irregular operation on making and breaking contacts. The prior recorders which use key switches fail to compensate or correct for this condition and thus the overall integrity of the recorded data is severely handicapped. Furthermore, no provision is made for informing the operator when two keys are inadvertently actuated at the same time, or when successive keys are actuated at a faster rate than the speed of the tape motor and therefore errors introduced in this way go undetected. The use of mechanical interlocking means has been suggested as a way to overcoming these error conditions but such an expedient introduces mechanical complexities in the construction of the recorder, increases size, and weight of the recorder, increases manufacturing cost, slows up free operation of keys, requires frequent servicing, and is generally undesirable in an inexpensive, light-weight, portable magnetic tape recorder.

The present invention is directed at overcoming the above and other shortcomings of prior portable magnetic tape data recorders, and at the same time at providing an improved recorder having features which increase reliability of recording, economy in manufacture, ease and convenience of operation, and which insure a long, trouble-free operating life.

According to the invention, there is provided a portable magnetic tape data recorder of the character described which includes electronic means for delaying recording as each key switch is operated until contact is completed, and with means for eliminating any spurious signal which may occur when the key switch is opened. The recorder further includes a novel detector circuit arranged to insure that no data will be recorded when two or more key switches are depressed simultaneously, or two successive keys are depressed at a faster rate than the speed of the magnetic tape drive, and at the same time to present a visible signal to alert and inform the operator of the error condition thus created. The recorder further provides visible signals for indicating when battery voltage is excessively low and when the tail end of the magnetic tape has been reached. The recorder employs electronic circuits using inexpensive binary logic components of proven reliability and simplicity. This enables economy in manufacture since integrated circuits can be used to a maximum extent in cooperation with discrete circuit components. Mechanical complexity is minimized, and miniaturization of the entire recorder assembly is made possible. The recorder further includes means for recording on dual magnetic tracks simultaneously to increase playback reliability and includes features of relatively simple character which produce results heretofore attainable only by complex, elaborate, means and available only in large complicated expensive data recording equipment.

Accordingly, it is a principal object of the present invention to provide an improved portable magnetic tape recorder having increased reliability of recording and economy of manufacture.

It is another object of the present invention to provide a portable magnetic tape recorder having a plurality of keyboard switches and which eliminates any spurious signals occuring when a keyboard switch is closed or opened.

Yet another object of the present invention is to provide a portable magnetic tape recorder of the aforementioned type which terminates recording when a keying error condition is detected.

These and other objects and many of the attendant advantages of this invention will be readily appreciated as the same becomes better understood by reference to the following detailed description when considered in connection with the accompanying drawings in which.

Figure 3A:
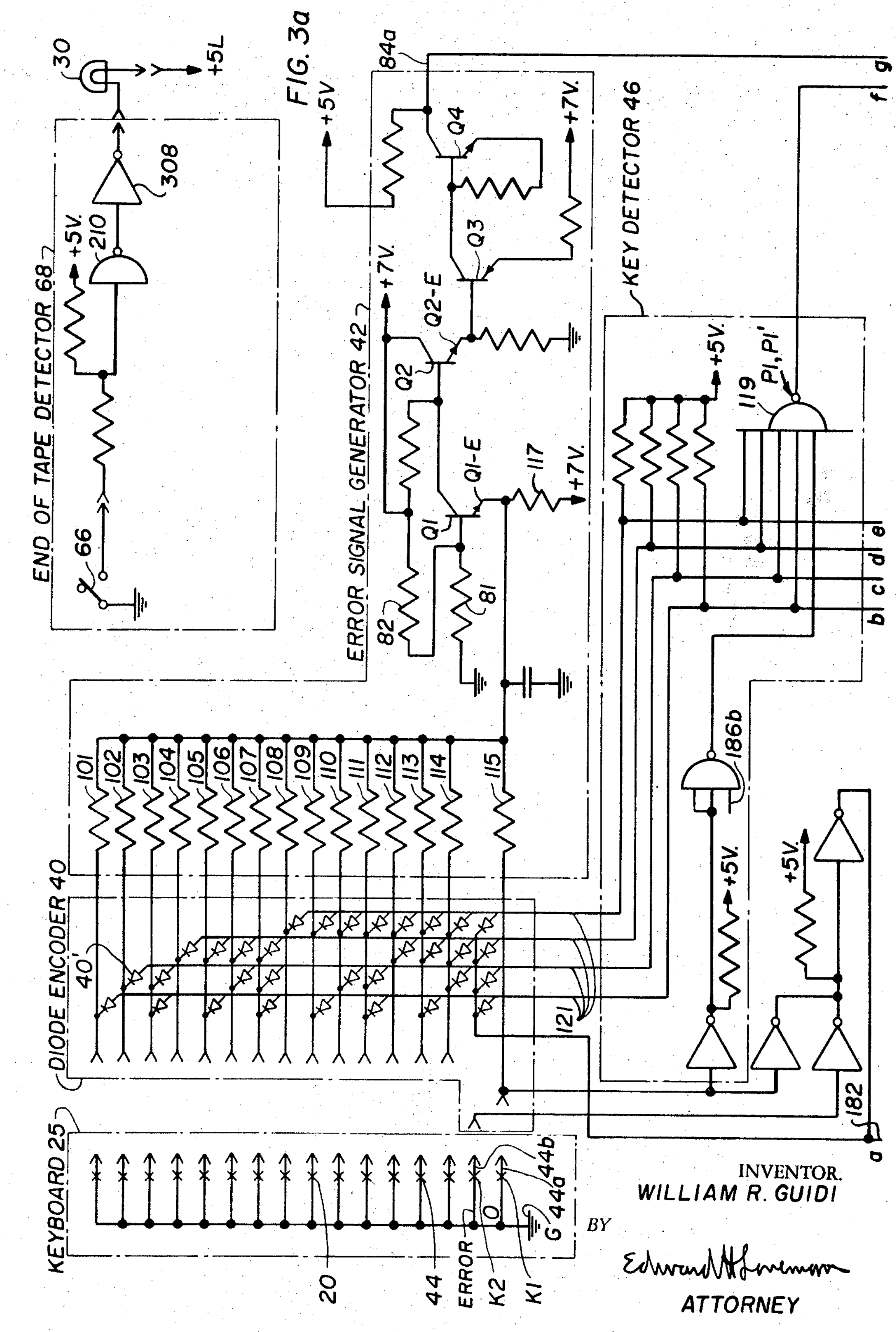
Figure 3B:
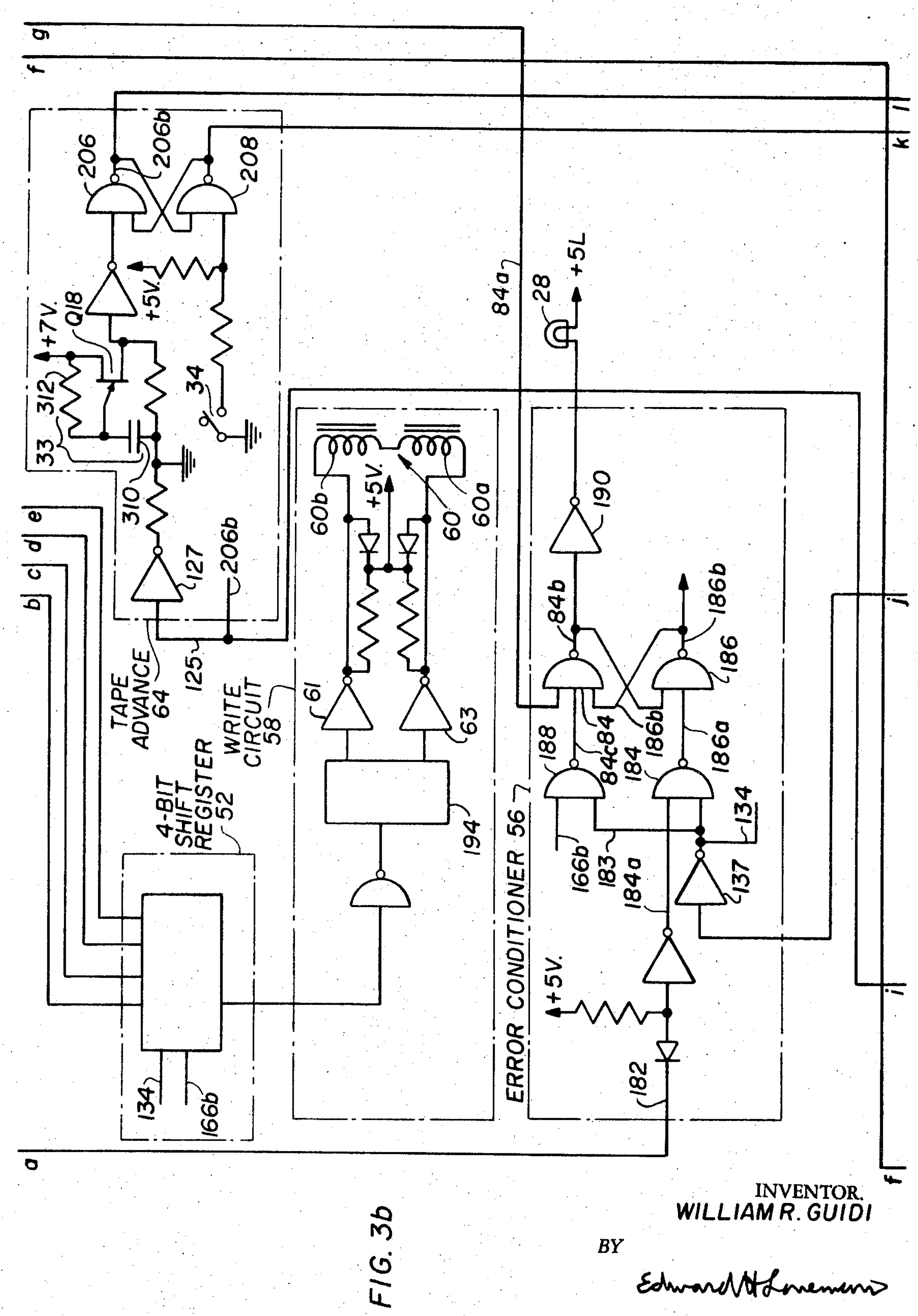
Figure 3C:
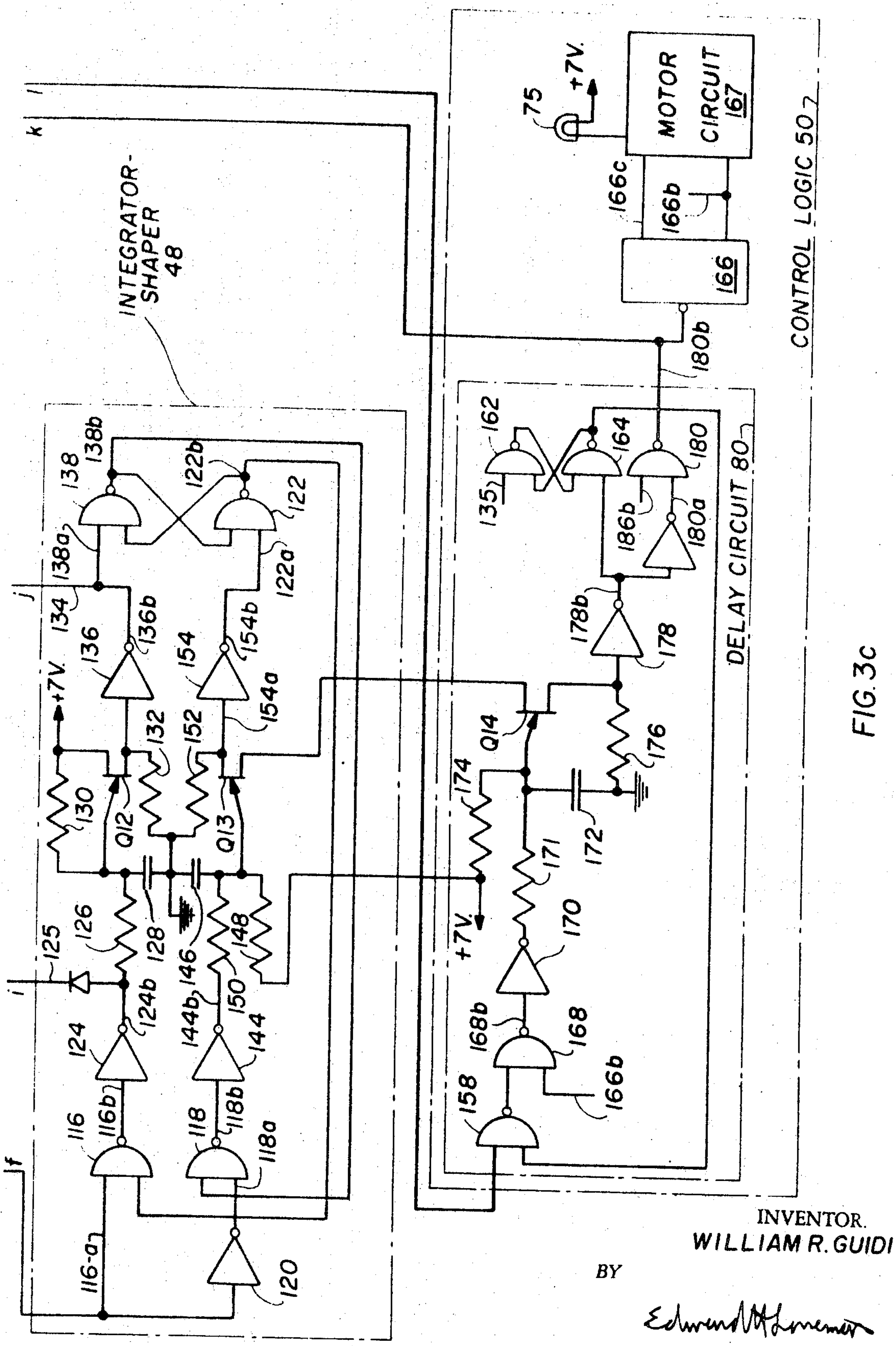
Figure 3E:
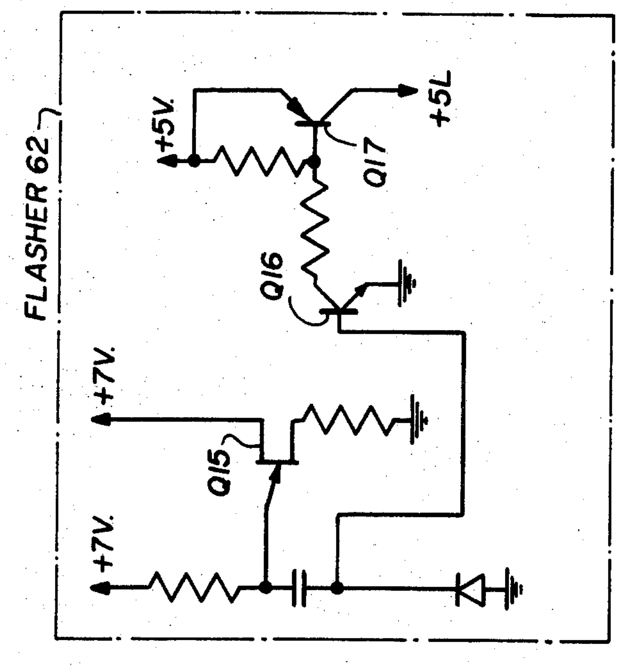
Figure 3D:
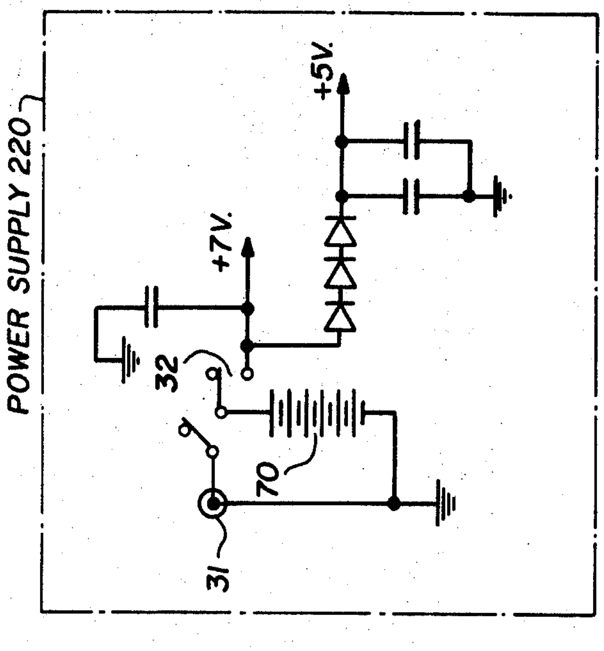

FIG. 3*a* is a schematic diagram of the end of tape detector, error signal generator and key detector portions of the recorder circuit;

FIG. 3*b* is a schematic diagram of the 4-bit shift register, tape advance circuit, write circuit and error conditioner circuit portions of the recorder circuit;

FIG. 3*c* is a schematic diagram of the integrator-shaper circuit and control logic circuit portions of the recorder circuit;

FIG. 3*d* is a schematic diagram of the power supply; and

Figure 4:
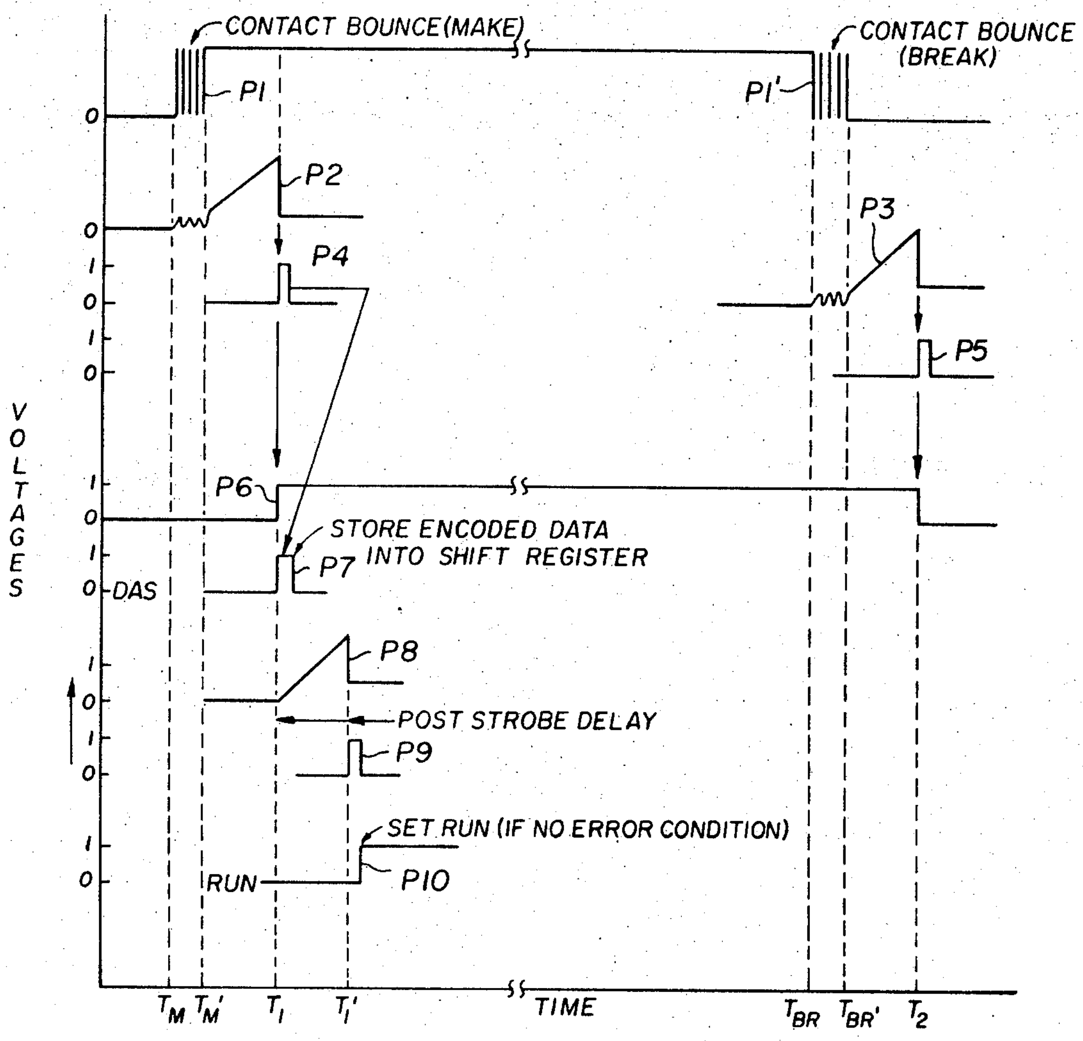

FIG. 3*e* is a schematic diagram of the flasher circuit portions of the recorder circuit; and FIG. 4 is a a graphic timing diagram used in explaining the invention.

Figure 1:
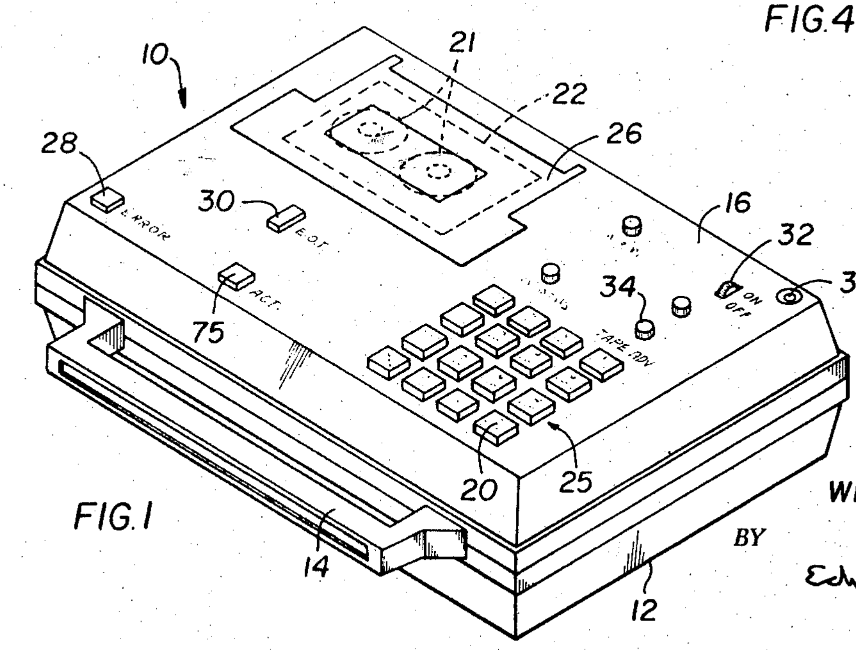
FIG. 1 is a perspective external view of a hand portable key operated, cassette tape data recorder embodying the invention.
Figure 2:
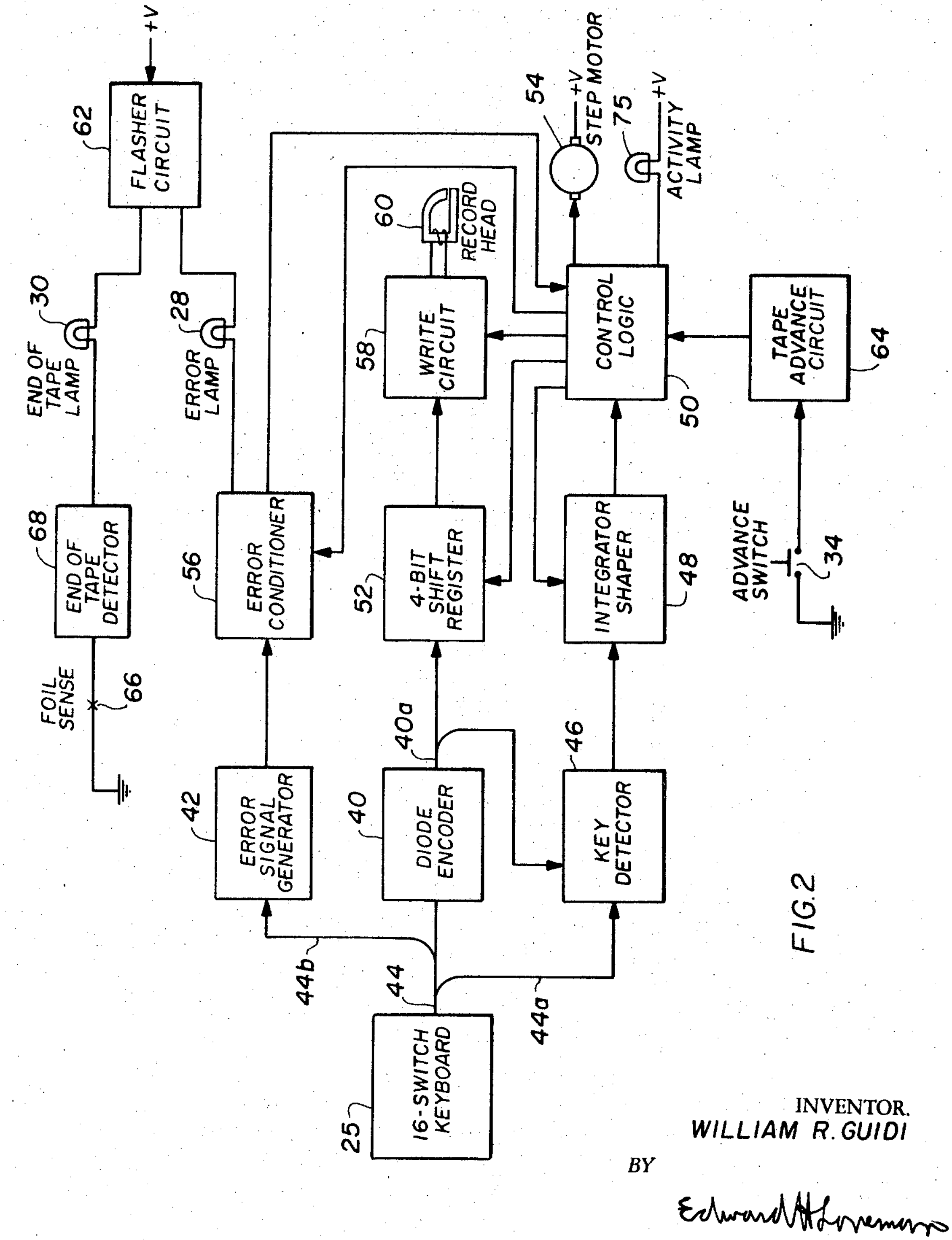
FIG. 2 is a block diagram of the overall circuit of the recorder embodying the invention.

Referring now to the drawings wherein like reference characters designated like or corresponding parts throughout, there is illustrated in FIG. 1, a recorder generally designated as reference numeral 10 which has a flat rectangular cabinet 12 provided with a carrying handle 14. On a front panel 16 is an array of sixteen keys or key switches 20 constituting an operating keyboard 25 for the recorded by means of which data is fed into the recorder for recording on magnetic tape carried by a pair of step motor driven reels 21 in a cassette 22 located in a compartment closed by a hinged door 26. An error indicating lamp 28 on the front panel provides a flashing signal to indicate that two or more keys 20 have been struck simultaneously. Also provided is a lamp 30 for indicating that the tape in the cassette has been completely run through, a battery charging jack 31, an ON-OFF power switch 32, a lamp 75 for indicating when a key is depressed and the condition of the battery, and a switch 34, for advancing the tape. The circuit of the recorder will first be described in general terms with particular reference to FIG. 2 which shows a block diagram of the recorder circuit.

Data is entered into the recorder by manually operating the keys or key switches 20, one at a time. Electrical pulses corresponding to the data entered are applied from the keyboard 25 simultaneously to a diode encoder 40 and an error signal generator 42 which produces an output signal when two or more keys are simultaneously depressed. Under normal keying operation only one of the sixteen keys 20 should be depressed at a time, to energize only one of the corresponding sixteen output leads 44. Thus fifteen of the sixteen keyboard leads 44 excluding a "0" key lead 44*a* apply data to the diode encoder 40. The "0" key lead 44*a* and fourteen other data key leads excluding the ERROR key lead 44*b* apply data pulses to the error signal generator 42. A 4-bit encoded signal from the diode encoder 40 which represents the specific key depressed is simultaneously applied via leads 40*a* to a 4-bit register 52 and to a key detector 46 which signifies when any one of the keys 20 has been depressed. The "0" key lead from the keyboard 25 is applied directly to the key detector 46. As a selected one of the keys 20 is depressed the key detector 46 generates a signal which is applied to an integrator-shaper circuit 48, the function of which is to filter out contact "bounce" from the pulses P1 and P1′ (FIG. 4) which are inherent in mechanical contact key switches such as are used in the keyboard 25. The integrator-shaper circuit 48 reshapes the signal applied to it so that it is suitable for application to integrated circuits in the control logic circuit 50. If a tape drive step motor 54 is not engaged in a tape advance mode, the reshaped signal from the integrator-shaper circuit 48 is utilized in the control logic circuit 50 to generate a single strobe pulse only a few microseconds in width. This strobe pulses is applied to the 4-bit shift register 52 which effectively stores the encoded data which has been presented by the diode encoder 40. Approximately 1 millisecond later the control logic circuit 50 examines the status of an error signal conditioner 56. If no error condition exists, due to simultaneous double key operation or the keying rate exceeding the speed of the tape drive motor, the control logic circuit 50 starts generation of a main clock pulse which is used by the control logic circuit 50 to advance the step motor 54 and simultaneously shift the data from the 4-bit shift register 52 through write circuit 58 to a dual-track magnetic record head 60.

During the time required to record the data serially on the magnetic tape in the cassette, the control logic circuit establishes a BUSY state. If a subsequent key is pressed during this BUSY state, the conflict is sensed by the error signal conditioner 56 and an ERROR condition is established. Thus the error signal conditioner 56 establishes an ERROR condition whenever more than one key 20 is depressed and whenever a key is depressed after the control logic circuit 50 has established a BUSY state.

Whenever an ERROR condition occurs the ERROR lamp 28 is lighted by the error signal conditioner 56 and flashes on and off under control of a flasher circuit 62, which is activated by the error signal conditioner 56. During an ERROR condition the control logic circuit 50 will complete the recording of a given data character if such recording was already in progress at the time, but it will present recording of all subsequent data entered via the keyboard until the ERROR condition is cleared.

The ERROR condition is cleared by depressed the "0" key K1 (FIG. 3*a*) and the ERROR key K2 on key board 25. If only one of these two keys is depressed no error clearing action will result. When both of these keys are depressed the ERROR condition will be cleared and recording may continue.

After a cassette 22 is loaded into the recorder 10, the operator will momentarily depress the tape ADVANCE switch 34 on the panel 16. This transmits a signal that is sensed by a tape advance circuit 64 which in conjunction with the control logic circuit 50 causes the step motor 54 to step at its maximum stepping rate for a predetermined length of time (from 5 to 10 seconds) established by a timing circuit 33 in the tape advance circuit 64 (FIG. 3*b*). During the tape advance period no data is recorded on the tape and any entries made on the keyboard 25 are ignored by the recorder. The purpose of this semiautomatic advance cycle is to advance the tape off the nonmagnetic leader portion of the tape in the cassette to a point where the beginning of the magnetic portion of the tape is positioned in front of the record head 60.

The recorder includes a conductive port (not shown) which detects the metallic foil on the tape. This foil is located a few inches from the tail end of the tape in the cassette. As the foil passes by this post a ground signal is applied via a switch 66 to the end-of-tape detector 68 which stores this signal causing the END OF TAPE lamp 30 to light. This light is flashed on and off by the flasher circuit 62 and also alerts the operator that only a few inches of the tape remains for subsequent recording.

Certain portions of the recorder circuit referred to above will now be described in greater detail which are best illustrated in FIGS. 3*a*, 3*b*, 3*c*, and 3*d* and in the timing diagram of FIG. 4.

The error signal generator 42 (FIG. 3*a*) is an analog circuit including transistors Q1–Q4 as principal active components. The circuit operates from the battery potential obtained from a battery 70 connected in series with the ON-OFF power switch 32 (FIG. 3*d*). The detector 42 will function over a relatively wide range of voltage variation. This is important since the battery potential will drop during use as its internal impedance increases. Battery 70 is preferably one of the rechargeable type and the circuit may include a rectifier for recharging the battery from an external alternating current source (not shown) via the jack 31 (FIG. 1).

The voltage applied to an emitter Q1–E of a transistor Q1 will be equal to the battery voltage (+7 volts) when none of the keys 20 is depressed. The voltage at a base of the transistor Q1 will be one-half the battery voltage due to a pair of resistors 81 and 82 which each have a resistance of 1000 ohms. Thus when no keys are depressed the transistor Q1 is back-biased and cut-off. A transistor Q2 has an emitter follower configuration and thus the switching transistors Q3 and Q4 are cut off. This presents a logical "1" (+5volts) signal via a lead 84*a* to a NAND gate 84 (FIG. 3*b*) in the error conditioner 56. If any one of the keys 20 is depressed, a corresponding one of the resistors 101–115 will be grounded at a point G through the make contact of the operated key switch. Since the resistors 101 through 115 and a resistor 117 in circuit with the Q1 emitter all have the same resistance value (1,000 ohms) the operation of a key switch results in reducing the voltage applied to the emitter Q1-E of the transistor Q1 to one half the battery voltage, and thus the base voltage and emitter voltage are equal in magnitude. Due to the forward diode potential (approximately 0.6 volts) of the diodes 40' in the diode encoder 40 the transistor Q1 will remain cut-off and no change in signal will appear on the lead **84*a* of the gate 84.**

If two or more keys are depressed at the same time, the resulting voltage applied to the emitter of the transistor Q1 will be equal to or less than one-third (⅓) of the battery voltage normally applied. Consequently the base-emitter junction of the transistor Q1 will be forward biased by a potential equal to or greater than ½ − ⅓ = 1/6 of the battery voltage and Q1 will conduct. Note that this forward bias condition will occur under these circumstances with any battery potential except for a potential of +3.6 volts or less. When the battery potential reaches 3.6 volts, the forward bias potential will be only 1/6 × 3.6 = 0.6 volts, which will not be sufficient to cause the transistor Q1 to conduct. The battery potential will never be allowed to get this low since the tape drive step motor will become unreliable if the battery potential is too low, i.e., lower than approximately +4.5 volts. Therefore the ACTIVITY lamp 75 actuated by the control logic circuit 50 will fail to light when the battery potential is below approximately 4.5 volts, thus informing the operator of the recorder that the batteries 70 should be recharged or replaced.

When more than one of the keys 20 is depressed as mentioned above, the transistor Q1 conducts to reduce the base potential of Q2. The potential of the emitter Q2-E of the transistor Q2 will follow the reduced base potential of the transistor Q2 causing the switching transistors Q3 and Q4 to conduct. This results in a logical "0" (zero) volts level being applied via the lead 84a to the gate 84 causing the error signal conditioner 56 to "set" which constitutes the ERROR condition caused by depression of two or more keys mentioned above.

It should be emphasized here that the error signal generator 42 is a very economical form of analog circuit, yet it provides extremely reliable error detection. In the present recorder, the number of keys equal 16 but it can be increased, and the only additional circuit components required will be the addition of one additional resistor in the group 101–115 for each additional increase in inputs. This is very economical way of effecting error detection while the range of recordable input data is extended by addition of more inputs.

The integrator-shaper circuit 48 employs discrete unijunction transistor circuits in combination with integrated circuit logic units to provide integration and reshaping of "bounce-contaminated" signals. The contact switches employed in the keyboard 25 are subject to erratic mechanical switching contacts and contact interruptions known as "bounce" which occur when the switches close (MAKE) and when they open (BREAK). The function of the integrator-shaper circuit 48 is to produce "bounceless" signals exactly corresponding to the keyed inputs. This circuit can compensate for a wide range of bounce ranging from a few microseconds to many milliseconds. As a further feature, the amount of integration required for the "make" or initial contact portion P1 (FIG. 4) of the keyed signal can be separately adjusted from that required for the "break" or terminal portion P1' (FIG. 4) of the signal on opening the key switch.

In operation, the bounce-contaminated keyed signal from the diode encoder 40 (FIG. 3*a*) is applied via the lines 121 to a gate 119 of the key detector 46 which gate is arranged to perform an OR gating logic function. The output from the gate 119 is applied to an input **116*a*** of a NAND gate (FIG. 3*c*) in the integrator-shaper circuit 48 and inversely applied to an input 118a of a NAND gate 118 via an invertor 120. At this point, it should be noted that the quiescent state at the output of the gate 119 is at a logical "0" and will be at a logical "1" level whenever any of the keys (excluding the error key) is depressed.

Thus assuming the logic level at an output **122*b* of a switching gate 122 is at a logic "1" and a key in the keyboard 25 is depressed, a logical "0" appears at an output 116*b* of the gate 116 which results in the opening of an output 124*b* of an invertor 124 which in turn open circuits a resistor 126 which otherwise effectively applies a short circuit across a capacitor 128, which now charges toward the avalanche voltage of a unijunction transistor Q12 through a resistor 130. During the bounce portion P1 (FIG. 4) while one of the keys is depressed capacitor 128 is discharged faster than it can charge. That is, the discharged path of the capacitor 128 is through the resistor 126 while the charging path of the capacitor 128 is through the resistor 130 which has a substantially larger resistance than the resistor 126. Consequently, the avalanche potential of the unijunction transistor Q12 will not be reached throughout the bounce period TM-TM' (FIG. 4) of the applied key signal. After the keyed signal stops bouncing for a period of time TM'-T1 (FIG. 4), as determined by the time constant of the resistor 130 and the capacitor 128, the avalanche potential of the transistor Q12 will be reached. This results in discharging the capacitor 128 rapidly through the transistor Q12 and a resistor 132 (pulse P2 FIG. 4) and producing a positive pulse P4 (FIG. 4) whose width is determined by the capacitor 128 and the resistor 132. This may be approximately 5 microseconds. A corresponding positive (logic level of "1") pulse 134 (P7 in FIG. 4) constitutes the "data strobe pulse" which will hereinafter be referred to in more detail. The pulse P7 occurs at time T1 (FIG. 4) which corresponds to a predetermined point in time after all bounce P1 from the operated key switch is ceased. It is at this time that the encoded data is stored in the 4-bolt register 52** which may be a miniature integrated circuit.

The pulse from the unijunction Q12 (FIG. 3*c*) is inverted by an inverter 136 and applied as a logic "0" to an input **138*a* of a NAND gate 138 which sets the output 138*b* to a logic "1." This logic level of "1" is in turn applied to both the input of the NAND gate 122 and the input of the NAND gate 118. Since both the inputs to the NAND gate 122 are now at a logic "1" level (122*c* input is at logic "1" as long as unijunction Q13 is cut off) the output 122b of the gate 122 is at a logic "0" and is applied to the input of the NAND gate 138 and the input of the of the gate 116 thereby latching the gates 116 and 138 such that their outputs 116*b* and 138*b* respectively remain at a logic "1" level. Thus, with the input to the inverter 124 at a logic "1" the capacitor 128 cannot discharge through the resistor 126 and the circuit to the transistor Q12 is prevented from behaving as a relaxation oscillator and also prevented from subsequent generation of a "data strobe pulse." In addition, the output 118*b* of the gate 118 is maintained at a logic "1" (as long as a key is depressed) which disables the unijunction transistor Q13 due to the logical "0" level at the output 144*b* of an inverter 144.** Therefore, as any key is depressed a single strobe pulse P7 is generated after all of the bounce has ceased on the keyed input signal.

When the depressed key is released the input 118*a* of the gate 118 returns to a logical "1" and the output 118*b* of this gate returns to a logical "0" since 138*b* is at a logic "1." This in turn causes an output 144*b* of a transistor inverter 144 to open similar to the operation of the inverter 124 as explained for the depressing action of the key. Consequently, a capacitor 146 will charge slowly through a resistor 148 and discharge rapidly through a resistor 150 throughout the bounce interval TBR—TBR′ (FIG. 4) which thereby prevents the avalanche potential of the transistor Q13 from being reached. When the bounce has ceased, the avalanche potential will be reached as shown as pulse P3 (FIG. 4) after a period of time T2-TBR′ (FIG. 4) determined by the time constant of the capacitor 146 and the resistor 148. It should be noted here that the time constant of the capacitor 128 and the resistor 130 is the same as that of the capacitor 146 and the resistor 148. This is because the make and break bounce characteristics of the key switches employed in the particular keyboard 25 are very similar. However if the make and break bounce characteristics are determined to be substantially different, the values of the capacitors 128 and 146 and the resistors 130 and 148 may be adjusted accordingly.

When the avalanche potential of the transistor Q13 is reached, the capacitor 146 discharges at time T1 (FIG. 4) through the unijunction transistor Q13 and a resistor 152, producing a short (5 microseconds) pulse P5 (FIG. 4) at an input 154*a* of an inverter 154. The inverted pulse at an output 154*b* is at logic "0" which sets the NAND gate output 122*b* to logic "1." This signal is applied to the input of NAND gates 138 and 116 thereby resetting the respective NAND gates 138 and 116 to the starting logic levels. Since the input 118*a* is now at "0" logic level the output 118*b* from the NAND gate 118 is at a logic "1" and the inverter 144 conducts such that the capacitor 146 discharges through the resistor 150 which is short circuited. Once again the unijunction transistor circuit of the transistor Q13 is prevented from behaving as a relaxation oscillator. When a new key is depressed the entire sequence is repeated.

The error conditioner 56 (FIG. 3) is comprised of four NAND gates respectively designated 184, 186, 188 and 84. Assuming an input an input 166*b* to the gate 188 from an output Flip-flop 166 (FIG. 3*c*) is at logic "0" then the input 84c to the gate 84 is at logic "1." Assuming also that no error signal is applied at the input 84*a* then this input also at a logic "1" level as is an input 186*b*. The output 84*b* from the gate 84 is thus at a logic "0" level and this signal is inverted by an inverter 190, which thereby prevents the ERROR lamp 28 from being energized. When an error exists as determined by the signal generator 42 (as hereinbefore described), the input at 84*a* is at a logic "0" level therefore setting the output 84*b* of the NAND gate 84 at a logic "1" which is inverted by the inverter 190 thereby providing a "0" logic or ground potential for the ERROR lamp 28. If the error key and the "0" key have not been depressed, the input at the NAND gate 184 is at a logic "0" and thus the input 186*a* to gate 186 is at a logic "1." If an error has been detected by the error signal generator, the output 84*b* from the gate 84 is a logic "1" level and is applied to the input of the gate 186. Since both inputs to the gate 186 are now at logic "1" the output 186*b* is at logic "0." This output which is used in the control circuit 50 will be hereinafter described in more detail. When both the error key K2 and the "0" key K1 have been depressed the combined signal 182 is applied to the error conditioner 56 and thus the input 184*a* of the gate 184 is at a logic "1" level as is the input 134. The output of the gate 184 is hence set at a logic "0" thereby setting the output 186*b* of gate 186 to a logic "1" and latching the gate 84 so that its output 84b is at a logic "0" level which prevents the ERROR lamp 28 from being energized.

A delay circuit 80 (FIG. 3*c*) in the control logic 50 checks the status of the keyed input after data is stored in the shift register 52. This data is not stored until all bounce arising from operation of a key switch has ceased. Thus the signal 135 ("0" logic level pulse) from an output of an inverter 137 is applied to a NAND gate 162 and the logic "1" output from this gate is applied to a NAND gate 164. The "0" logic level output from the gate 164 is applied to both a gate 158 and the gate 162 thereby latching the gate 164. Thus the output of the gate 158 is set to a logical "1." Assuming an output 166*b* from a Flip-flop 166 is not set at this time, both inputs to a gate 168 are at a logical "1" level thereby forcing the output 168*b* of this gate to a logical "0." Similar to the unijunction transistor circuits mentioned before the logical "0" level appearing at an input 170*a* of an open collector transistor inverter 170 causes a capacitor 172 to charge to the avalanche potential of a transistor Q14 in a time determined by the capacitor 172 and a resistor 174 (approximately 1 millisecond). This is shown as pulse P8 in FIG. 3. The inverse of the resulting positive pulse developed across a resistor 176 appears at an output 178*b* of an inverter 178. This signal resets the gate 164 such that its output is now logic "1" and the output of the gate 158 is thereby set at a logic "0" level thus causing the inverter 170 to conduct and a resistor 171 to short the capacitor 172 to prevent the transistor Q14 from behaving as a relaxation oscillator. The inverse of the positive pulse accross the resistor 176 also appears at an input 180*a* of a gate 180 as a positive pulse P9 (FIG. 4). The pulse at the input 180*a* of the gate 180 corresponds to a delay pulse. That is to say, that at time T1′ (FIG. 3) approximately one millisecond following the occurrence of a pulse P7 on the lead 134 which caused the keyed input data to be stored in the 4-but shift register 52, pulse P9 appears at the input 180*a* of the gate 180 and this signal is used to sample the condition of an inverted error signal 186*b* from the error conditioner 56. If the error signal 186*b* is at logical "0" indicating that an ERROR condition is in effect, an output 180*b* of the gate 180 will remain at logical "1" resulting in no stepping of the step motor 54 and no recording of data. If the inverted error signal 186*b* is at a logical "1" level, indicating no error condition, and since the input 180*a* (Pulse P9) is positive the output 180*b* will be at logic "0." Consequently, a pulse will appear at the input of a Flip-flop 166 which will cause this Flip-flop to set thereby placing a logical "1" level (P10, FIG. 3) at the flop output 166*b* and the input to a motor drive circuit 167. When the Flip-flop 166 is thus set, a main clock (not shown) is started and recording of data begins in synchromism with incremental advances of magnetic tape by the step motor 54.

The logical action of the delay circuit 80 is significant in that it checks the status of the keyed input after data is cleanly stored in the shift register 52. Therefore apart from the fact that data was not stored in the shift register 52 until all bounce has ceased, the recording of data will not begin unless no ERROR condition was also in effect. If two or more keys were depressed before, during or after the strobe interval but before the generation of the delay pulse, the error signal generator 42 would have established an ERROR condition and no recording of data would ensue.

If the sumultaneous keyed input was such that simultaneity occurred beyond a time period greater than one millisecond, then the error condition will be generated in the error conditioner 56 and the character corresponding to the earliest input will be recorded. However, the ERROR condition which will now occur while the recording of data is in progress will not affect this cycle nor will it affect the recording of data corresponding to the earliest keyed input. It will however prevent subsequent tape cycles until the ERROR key K2 is depressed together with the "0" key K1 as explained above. Thus, when the control logic circuit establishes a BUSY state, by the "1" logical level at Flip-flop output **166*b*, this signal is applied to the gate 188 of the error conditioner 56 (FIG. 26) and if a key has been depressed then a logical "1" signal will appear at 183 thereby setting input 84c to "0" logic to open the inverter 190 and cause the lamp 28** to illuminate.

It should be noted that this circuit makes it possible to cope electronically with improper keying without use of mechanical interlocks for the key switches at the keyboard. This effects a considerable economy in manufacture as well as simplification of mechanical structure as mentioned previously.

In order to obtain recording and playback of digital data on magnetic tape it has been found that recording the same information on two tracks is more reliable than recording this information on only one track. This is based on the probability that dirt, oxide, folds in the tape, and other conditions adversely affecting the recording of data will most likely not occur at two points on the same vertical line across the width of the tape. The present recorder makes use of this principle in recording data on both tracks of a cassette tape simultaneously.

The write circuit 58 as shown in FIG. **3*b* is a relatively simple circuit wherein a Flip-Flop 194 provides double-frequency non-return to zero recording signals to the two-track recording head 60 through a pair of open collector transistor inverters 61 and 63. The windings 60*a*, 60*b*** of both sections of the recording head are arranged in series such that the two tracks receive identical recording pulses.

The same type of magnetic head construction may be used for playback purposes at a data reproducer (not shown) whereby only one playback amplifier would be required. The result will be that if a total dropout of data occurs in one track at a given point on the tape, it is highly probable that a similar dropout will not occur simultaneously in the other track. This redundancy of recording thus provides increased reliability over use of a single track.

In the tape advance circuit FIG. **3*b* the signal 125 from the inverter 124 in the integrator-shaper 48 is used to advance the tape. The tape advance circuit 64 is comprised of a transistor Q18 and NAND gates 206 and 208 and operates in a manner similar to that heretofor described in the other circuits. That is the signal 125 is inverted by the inverter 127 and charges a capacitor 310 through a resistor 312 and when the avalanche potential of the transistor Q18 is reached the transistor fires and the logic "0" signal is inverted by an inverter 205 and applied to the input of a NAND gate 206 as a logic "1." The output from the NAND gate 206 is applied to the delay circuit 80 and operates in the manner previously described to energize the motor circuit 167 and also is applied to the input of the inverter 127 to reset the loop and shut off the transistor Q18. When the switch 34 is closed the input to the NAND gate 208 drops to a logical "0" and the output of logic "1" is applied to the input of the gate 206. Since the remaining inputs to the gate 206 are at logic "1" the output sets to logic "0" and this signal is applied to inverter 127 which causes the transistor Q18 to fire as hereinbefore described. It should be noted that the timing circuit 33 hereinbefore mentioned is comprised of the capacitor 310 and the resistor 312 which permit the tape to be advanced when the switch 34** is closed until the avalanche of transistor Q18 is reached.

The flasher circuit 62 (FIG. **3*d***) is a simple relaxation oscillator comprised of a unijunction transistor Q15 and switch transistors Q16 and Q17 which are connected together and function in a manner well known in the art.

The end of tape detector 68 (FIG. **3*a*) is comprised of the magnetic switch 66 which when activated by the metal foil located near the end of the tape closes to apply a ground ("0" logic) to the input of NAND gate 210. The logic "1" output of the gate 210 is inverted by the inverter 308 to permit the lamp 30** to illuminate.

In the foregoing description of the circuits, only those circuits have been described in detail which are essential to an understanding of the invention. Circuit components such as biasing resistors, filtering capacitors and latching gates have not been described since their mode of operation are well-known to those skilled in the art.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A recording device for recording data pulses on a magnetic tape comprising, a plurality of manually operable make and break control key switches, a power supply connected in circuit with said switches for generating pulses as said switches are operated respectively, a pulse encoder means connected in circuit with said switches to encode pulses generated by the operation of said switches, a shift register connected in circuit with said pulse encoder means and arranged to store the encoded pulses only after receiving a control pulse, a key detector connected in circuit with said switches and responsive to the operation of only a selected one of said switches at a time, and, an integrator-shaper circuit connected in circuit with said detector and arranged to generate a first control pulse starting after the initial contact by said selected key switches has been completed, and apply said first control pulse to said shift register whereby the effect of initial contact bounce by said selected switch is eliminated by not permitting said shift register to store encoded pulses until said control pulse is received.

2. A recording device as defined in claim 1 further comprising means in said integrator shaper circuit for generating a second control pulse to suppress any terminal contact bounce pulse generated at said pulse encoder when said selected key switch is opened.

3. A recording device as defined in claim 1 wherein said keying detector further comprises pulse generating circuit means connected in circuit with said integrator-shaper circuit to generate a third control pulse; and write circuit means connected to said shift register to receive stored data pulses therefrom for recording on the tape when said second control pulse is generated.

4. A recording device for recording data pulses on a magnetic tape as defined in claim 3 further comprising a recording head having dual windings connected in series for simultaneously recording data pulses magnetically at two points spaced apart transeversely of said tape to minimize recording errors, said dual winding being connected to said write circuit for receiving data pulses therefrom for recording on said tape.

5. A recording device as defined in claim 4 further comprising, a tape drive motor connected in circuit with said power supply for advancing said tape while data pulses received by said recording head are recorded on said tape; and a control logic circuit interconnecting said motor and said power supply for enabling the drive motor to advance said tape.

* * * * *